(12) United States Patent
Altman et al.

(10) Patent No.: US 10,365,848 B2
(45) Date of Patent: Jul. 30, 2019

(54) SPACE RESERVATION FOR DISTRIBUTED STORAGE SYSTEMS

(71) Applicant: NetApp, Inc., Sunnyvale, CA (US)

(72) Inventors: Tymoteusz Altman, Vancouver (CA); Yi Zhang, Vancouver (CA); Dheeraj Raghavender Sangamkar, Vancouver (CA); Emalayan Vairavanathan, Vancouver (CA)

(73) Assignee: NETAPP, INC., Sunnyvale, CA (US)

( * ) Notice: Subject to any disclaimer, the term of this patent is extended or adjusted under 35 U.S.C. 154(b) by 122 days.

(21) Appl. No.: 15/338,077

(22) Filed: Oct. 28, 2016

(65) Prior Publication Data

US 2017/0160982 A1   Jun. 8, 2017

Related U.S. Application Data

(60) Provisional application No. 62/262,128, filed on Dec. 2, 2015.

(51) Int. Cl.
*G06F 3/06* (2006.01)

(52) U.S. Cl.
CPC ............ *G06F 3/0644* (2013.01); *G06F 3/061* (2013.01); *G06F 3/067* (2013.01); *G06F 3/0631* (2013.01)

(58) Field of Classification Search
CPC .......... G06F 17/30575; G06F 11/1076; G06F 17/30091; G06F 17/30132; G06F 17/302; G06F 3/061; G06F 3/0631; G06F 3/0644; G06F 3/067; G06F 3/0643
See application file for complete search history.

(56) References Cited

U.S. PATENT DOCUMENTS

| | | | | |
|---|---|---|---|---|
| 6,449,731 | B1 * | 9/2002 | Frey, Jr. | G06F 11/1076 707/999.202 |
| 7,600,083 | B2 * | 10/2009 | Aggarwal | G06F 3/0608 711/154 |
| 9,626,378 | B2 * | 4/2017 | Bernbo | G06F 17/30206 |
| 2003/0131068 | A1 * | 7/2003 | Hoshino | G06F 3/0613 709/216 |
| 2005/0257014 | A1 * | 11/2005 | Maki | G06F 3/0605 711/162 |
| 2007/0022148 | A1 * | 1/2007 | Akers | G06F 17/30138 |
| 2013/0227236 | A1 * | 8/2013 | Flynn | G11C 16/26 711/165 |

* cited by examiner

*Primary Examiner* — Zhuo H Li
(74) *Attorney, Agent, or Firm* — Haynes and Boone, LLP

(57) ABSTRACT

Techniques are described for reserving space on a destination node or volume for increasing the likelihood of a successful data transfer in a distributed storage environment. A reservation may be retried at one or more destinations if the reservation fails at a first destination. In some embodiments, the data-transfer process can be paused or terminated prior to data being transferred to one or more destinations if a reservation fails. Reserving space on a destination node or volume can increase the likelihood of a successful data transfer, which can increase the likelihood of efficient resources usage in a storage system.

20 Claims, 14 Drawing Sheets

| ds_uuid | destinations | status |
|---|---|---|
|  |  |  |
|  |  |  |
|  |  |  |
|  |  |  |
|  |  |  |

| ds_uuid | destinations | status |
|---|---|---|
| 1 | 120 | INPR |
|  |  |  |
|  |  |  |
|  |  |  |
|  |  |  |

| ds_uuid | destinations | status |
|---|---|---|
| 1 | 120 | SUCS |
|  |  |  |
|  |  |  |
|  |  |  |
|  |  |  |

| ds_uuid | destinations | status |
|---|---|---|
| 1 | 120 | SUCS |
| 2 | 121 | INPR |
|  |  |  |
|  |  |  |
|  |  |  |

| ds_uuid | destinations | status |
|---|---|---|
| 1 | 120 | SUCS |
| 2 | 121, 122 | INPR |
|  |  |  |
|  |  |  |
|  |  |  |

| ds_uuid | destinations | status |
|---|---|---|
| 1 | 120 | SUCS |
| 2 | 121, 122 | SUCS |
|  |  |  |
|  |  |  |
|  |  |  |

300 ⟶

| ds_uuid | destinations | status |
|---|---|---|
| 1 | 120 | SUCS |
| 2 | 121, 122 | SUCS |
| 3 | 123 | INPR |
| | | |
| | | |

| ds_uuid | destinations | status |
|---|---|---|
| 1 | 120 | ABRT |
| 2 | 121, 122 | ABRT |
| 3 | 123 | ABRT |
| | | |
| | | |

| ds_uuid | destinations | status |
|---|---|---|
| 2 | 121, 122 | ABRT |
| 3 | 123 | ABRT |
| | | |
| | | |
| | | |

| ds_uuid | destinations | status |
|---|---|---|
| 2 | 121 | ABRT |
| 3 | 123 | ABRT |
| | | |
| | | |
| | | |

| ds_uuid | destinations | status |
|---|---|---|
| | | |
| | | |
| | | |
| | | |
| | | |

FIG. 18

SPACE RESERVATION FOR DISTRIBUTED STORAGE SYSTEMS

BACKGROUND

The present disclosure relates generally to storage systems and more specifically to a methodology for ensuring that sufficient space is available for data transfers on destination storage nodes in a distributed storage environment.

In a large-scale distributed storage system, individual storage nodes will commonly fail or become unavailable from time to time. Therefore, storage systems typically implement some type of recovery scheme for recovering data that has been lost, degraded or otherwise compromised due to node failure or otherwise. One such scheme is known as erasure coding. Erasure coding generally involves the creation of codes used to introduce data redundancies (also called "parity data") that is stored along with original data (also referred to as "systematic data"), to thereby encode the data in a prescribed manner. If any systematic data or parity data becomes compromised, such data can be recovered through a series of mathematical calculations.

Erasure coding for a storage system involves algorithmically splitting a data file of size M into X chunks (also referred to as "fragments"), each of the same size M/X. An erasure code is applied to each of the X chunks to form A encoded chunks, which again each have the size M/X. The effective size of the data is $A*M/X$, which means the original data file M has been expanded by $(A-X)*(M/X)$, with the condition that $A \geq X$ Now, any X chunks of the available A encoded chunks can be used to recreate the original data file M. The erasure code applied to the data is denoted as (n, k), where n represents the total number of nodes across which all encoded chunks will be stored and k represents the number of systematic nodes (i.e., nodes that store only systematic data) employed. The number of parity nodes (i.e., nodes that store parity data) is thus $n-k=r$. Erasure codes following this construction are referred to as maximum distance separable (MDS), though other types of erasure codes exist.

Erasure-coded content and other content stored in a distributed data storage environment can span many volumes on many storage nodes. Operations involving content stored on such a distributed data storage environment can involve large data transfers among storage nodes. For example, successfully repairing erasure-coded content stored on some or all of a storage node or volume may involve transferring one or more large data sets from one or more volumes on source nodes to one or more volumes on destination nodes.

In some cases (e.g., a repair operation or other operation involving the transfer of a large data set), a destination node may lack sufficient space to receive an entire transferred data set. A storage node may run out of space in a storage system that is busy or is tight in terms of space. In one example, if a given data set is being transferred as part of a repair operation, the destination node may lack sufficient space to receive the data set because data from other data sources is being transferred to the destination node by other processes executed concurrently with the repair operation. Due to the lack of coordination in a decentralized system, these concurrent data transfers can deplete or otherwise reduce the available storage space on the destination node before all of the data set involved in the repair operation is transferred to the destination node. In another example, the destination node may lack sufficient space for receiving the entire data set involved in a repair operation even without concurrent data transfers depleting the available storage space at the destination node. In any of these examples, if a determination that the destination node has insufficient storage space for a data set is made after at least some of the data set has been transferred via the network, an incomplete transfer of the data set can result in wasted storage space on the destination node (e.g., portions of the incomplete data set that could have been used for other operations), wasted network bandwidth used for communicating portions of the data set to the destination node, wasted computational resources used in generating the data set, etc.

BRIEF DESCRIPTION OF THE DRAWINGS

Aspects of the disclosure may be better understood by referencing the accompanying drawings.

FIGS. 4-9 depict a reservation table that is used to track space reservations made during a space reservation process.

FIGS. 14-18 depict a reservation table that is used to track space reservations made during a space reservation process.

DESCRIPTION

Figure 1:
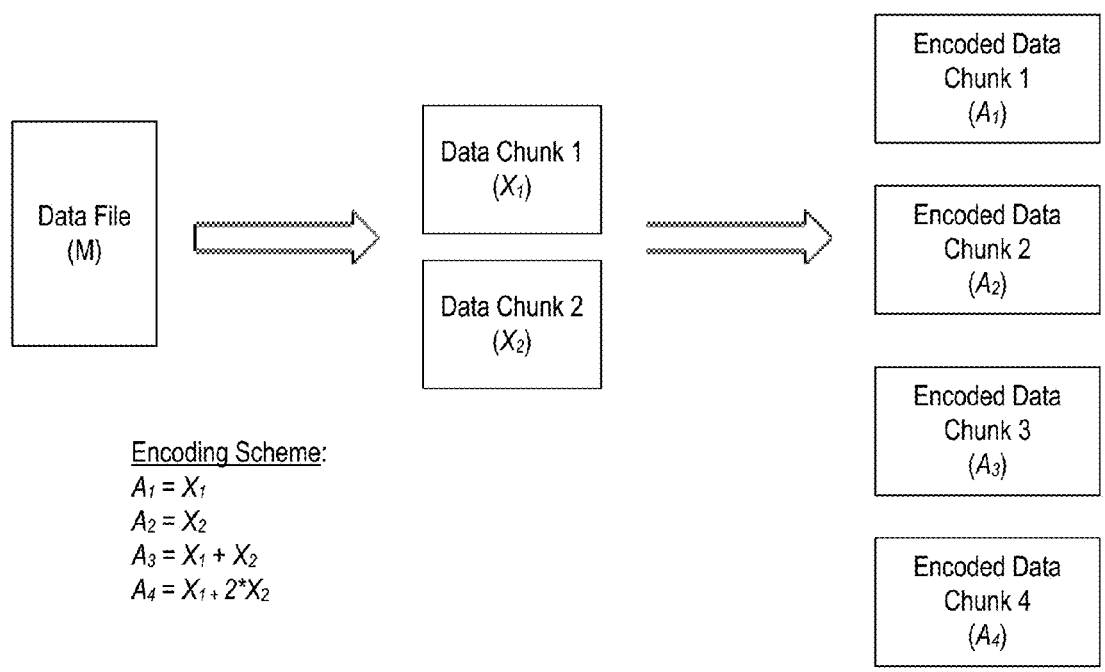
FIG. 1 depicts an example of a (4, 2) erasure code applied to a data file M.

The description that follows includes example systems, methods, techniques, and program flows that embody aspects of the disclosure. However, it is understood that this disclosure may be practiced without these specific details. For example, this disclosure describes managing space reservations for large data transfers in the context of distributed storage environments that store erasure-coded content. In some implementations, one or more features described herein can be used in any suitable data network that is used for copying, transferring, or otherwise communicating large amounts of data from a source to a destination in a process that requires transferring an entire data set for the process to be successful. In other instances, well-known instruction instances, protocols, structures and techniques have not been shown in detail in order not to obfuscate the description.

Overview

Techniques are described for reserving space on a destination node or volume for increasing the likelihood of a successful data transfer in a distributed storage environment. A reservation may be retried at one or more destinations if the reservation fails at a first destination. In some embodiments, the data-transfer process can be paused or terminated prior to data being transferred to one or more destinations if a reservation fails. Reserving space on a destination node or volume can increase the likelihood of a successful data transfer, which can increase the likelihood of efficient resources usage in a storage system.

The space reservation methods described herein can reduce inefficiencies in data-transfer processes in distributed storage environments. For example, erasure-coded content can be stored in a distributed storage environment as chunks (sometimes referred to as fragments) in directories such as virtual chunk spaces ("VCSes"). A given volume of a storage node can include many VCSes. For example, in a k+m erasure coding scheme, a given object can include k+m=n fragments. Each set of fragments $f_1 \ldots f_n$ is stored in a corresponding VCS from a set of $VCS_1 \ldots VCS_n$. Different VCSes in the set can be stored on different storage nodes. The chunks stored in a particular VCS can be reconstructed from chunks stored across the other VCSes. A VCS is stored on a single volume on a storage node and generally does not span multiple volumes or storage nodes). A given storage node may be used to storage thousands of VCSes across one or more volumes on the storage node.

A failure of a volume on the storage node (or the entire storage node) may require large data transfers and utilize large amounts of computational resources across the distributed storage environment to restore, reconstruct, or otherwise repair the affected VCSes that are stored on one or more failed volumes or storage nodes. For example, repairing a node or a volume on the node can involve restoring VCSes in their entirety at one or more destination volumes. In one example, all chunks in a VCS on a repaired volume on a source node are recreated in a destination VCS on a destination node that does not have a VCS from the same set. A repair operation may involve reconstructing multiple VCSes in parallel, and a failure to reconstruct one such VCS would fail the entire repair operation. This repair operation can be resource-intensive, and may take anywhere from days to a week depending on the amount of data lost or the available hardware resources (e.g., network bandwidth, disk space, processing resources, etc.).

In some cases, a VCS can include a large amount of data (e.g., 1 terabyte). Simply checking that a volume on a destination node has enough space for the VCS data may be insufficient for ensuring a successful data transfer. For example, on a fully active storage system, other data could be written to the volume on the destination node (e.g., from newly ingested data or other operations). If a VCS from a source node is being restored or otherwise repaired on a destination node, and some other processes ingests data for storage on the destination node, the space on the destination node may be depleted before the VCS is restored. This results in a failure of the entire restoration process, which requires cleaning up the VCS being restored and finding another destination node at which the VCS can be restored.

Example Illustrations

FIG. 1 depicts an example of a (4, 2) erasure code applied to a data file M. As shown, a data file M is split into two chunks $X_1$, $X_2$ of equal size and then an encoding scheme is applied to those chunks to produce 4 encoded chunks $A_1$, $A_2$, $A_3$, $A_4$. By way of example, the encoding scheme may be one that results in the following relationships: $A_1=X_1$; $A_2=X_2$; $A_3=X_1+X_2$; and $A_4=X_1+2*X_2$. In this manner, the 4 encoded chunks can be stored across a storage network 102, such that the one encoded data chunk is stored in each of four storage nodes 104a-d. Then, the encoded chunks stored in any 2 of the four storage nodes 104a-d can be used to recover the entire original data file M. This means that the original data file M can be recovered if any two of the storage nodes 104a-d fail, which would not be possible with traditional "mirrored" back-up data storage schemes.

Figure 2:
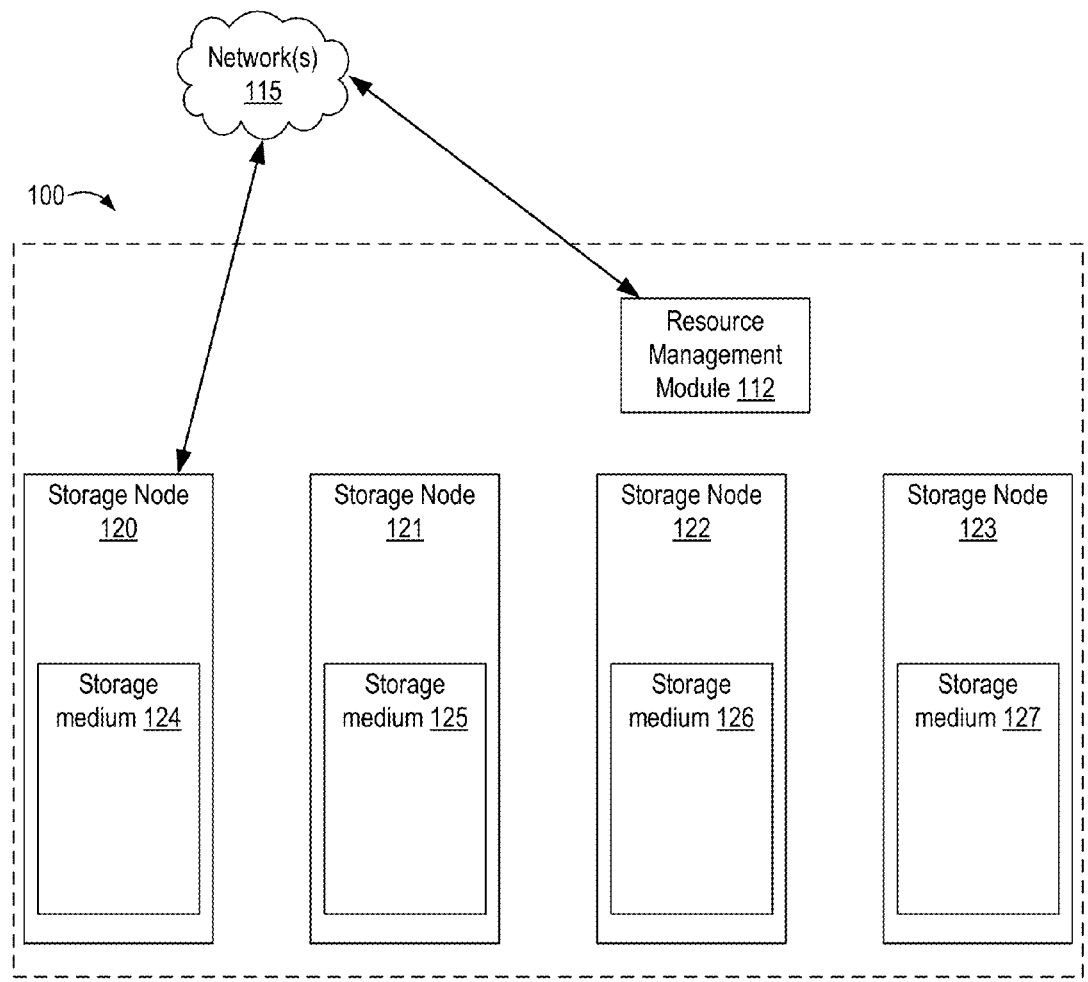
FIG. 2 is a block diagram depicting an example of a distributed storage system that uses a space reservation process.

FIG. 2 is a block diagram depicting an example of a distributed storage system 100 that uses a space reservation process. The distributed storage system 100 can include multiple storage nodes 120, 121, 122, 123 communicatively coupled to a data network 115. The storage nodes 120, 121, 122, 123 can execute multiple processing tasks in parallel. For illustrative purposes, FIG. 2 depicts a distributed storage system 100 that includes four storage nodes 120, 121, 122, 123. However, any number of storage nodes can be included in a distributed storage system 100.

Each of the storage nodes 120, 121, 122, 123 can include one or more processing devices and one or more memory devices. The processing devices can execute computer-readable instructions that configure the processing devices to perform one or more functions described herein. The storage nodes 120, 121, 122, 123 can also include one or more interface devices for communicating with data networks, other processing nodes, or other devices.

The storage nodes 120, 121, 122, 123 can also include respective storage media 124, 125, 126, 127. Each of the storage media 124, 125, 126, 127 includes one or more data storage devices. For example, the storage media 124, 125, 126, 127 may each include one or more hard disk drives, flash drives, solid state drives, flash memory, other types of storage devices, or a combination thereof.

The data network 115 can include one or more devices for exchanging information. In various embodiments, the data network 115 can include one or more of a local area network, a wide-area network, a metropolitan area network, a telecommunications network, the Internet, or any combination thereof. The data network 115 can also include routers, hubs, computers, servers, or other types of computing devices. The data network 115 may include one or more of wired communication links, wireless communication links, or a combination thereof.

In some embodiments, one or more of the storage nodes 120, 121, 122, 123 or another suitable computing device can execute a resource management module 112. The resource management module 112 includes suitable computing instructions that are executable by one or more processing devices for performing space-reservation tasks, coordinating data transfers in the distributed storage system 100, or otherwise managing resources in the distributed storage system 100.

The resource management module 112 can coordinate a data transfer process via the distributed storage system 100 by performing one or more space reservation functions. An example of coordinating the data transfer process is depicted in FIGS. 3-9. The resource management module 112 can maintain the states of various space reservations in a persistent table. In some embodiments, the resource management module 112 stores the state on another highly available storage node. The resource management module 112 persistently tracks space reservations so that unused/leaked space may be cleaned up after transient/permanent failures (e.g., storage node failures, network partitions).

Figure 3:
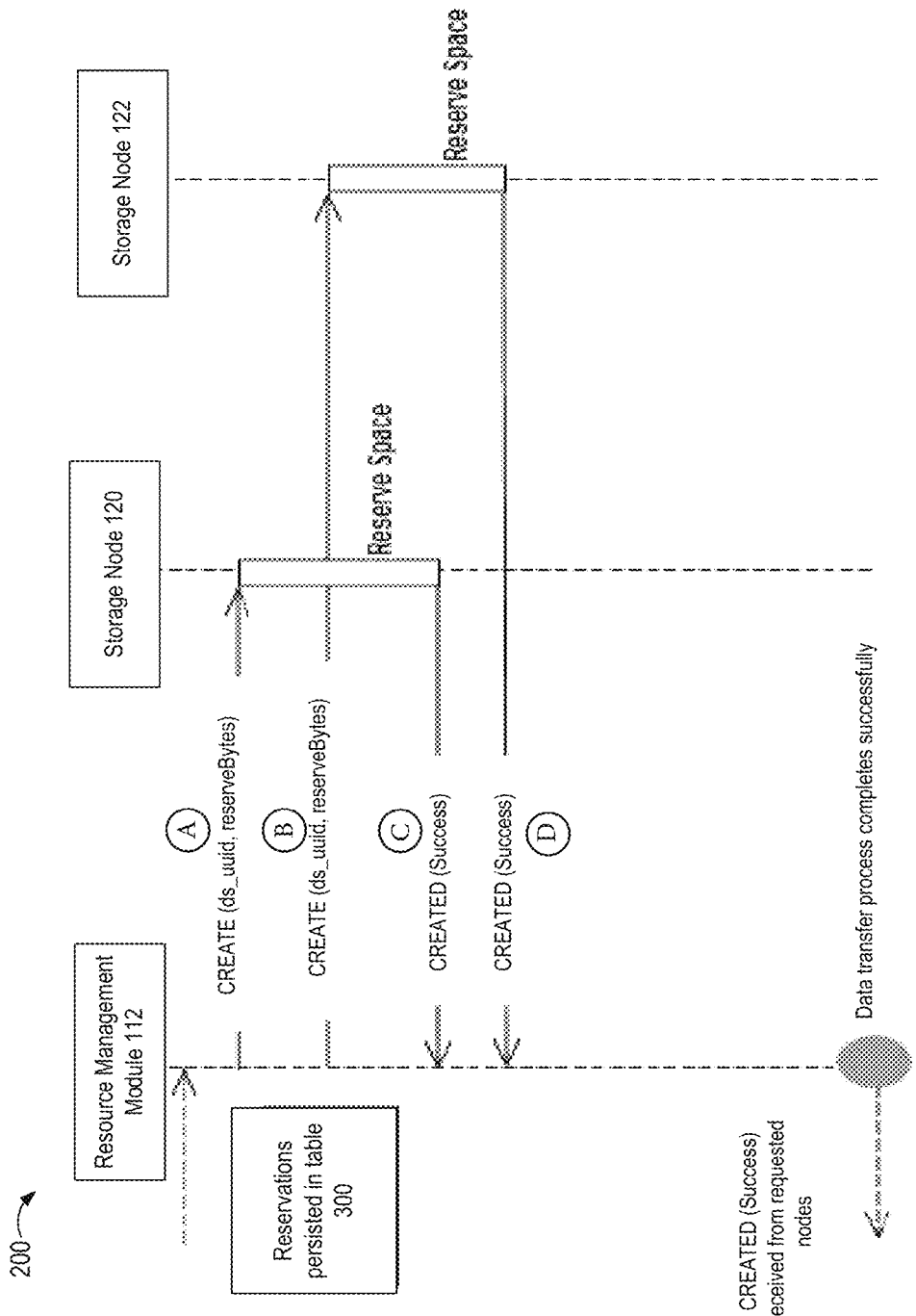
FIG. 3 depicts example operations for a space reservation process.

In the example depicted in FIGS. 3-9, the resource management module 112 manages the data-transfer process depicted in FIG. 3 using a table 300 that is depicted in FIGS. 4-9. Each row in the table 300 that has an identifier field (e.g., "ds_uuid") for a unique identifier of a data set being transferred, a destination field (e.g., "destinations") for tracking destination nodes at which space-reservation attempts are performed for the data set identified in the identifier field, and a status field (e.g., "status") that is used to track the state of the reservation at one or more destination nodes.

At stage A, the resource management module 112 reserves space for a new data set. The resource management module 112 adds a row to the table 300. For example, as depicted in FIG. 5, the table 300 is updated to include a row with a ds_uuid of "1" for the data set, a destination identifier of "120" for the storage node 120 at which space is to be reserved, and a status of "INPR" indicating that the reservation is in progress.

In this example, the resource management module 112 can transmit a CREATE message, as depicted in FIG. 3, or other suitable request or command message to a destination storage node 120 identified in the table 300. The CREATE message, request, or other message can cause the storage node 120 to create a directory for the data set to be transferred (i.e., "data set 1") and to reserve space on a volume of the destination node for the data set to be transferred. For example, the CREATE message depicted in FIG. 3 includes "ds_uuid" data to identify the data set to be transferred and "reserveBytes" data to identify an amount of space to be reserved at the destination storage node 120 for the data set.

In some embodiments, the space reservation can be performed at the storage node 120 using a posix_fallocate( ) command. The storage node 120 executes the $posix_{13}$ fallocate( ) command to reserve the entire requested space identified by the "reserveBytes" data of a CREATE message. The posix_fallocate( ) command can be used to reserve the required space for the data set prior to receiving the data set (i.e., without writing data from the data set into the storage medium 124 of the storage node 120).

In additional or alternative embodiments, the space reservation can be performed using other suitable commands executed at the storage node 120. A suitable command can be any file system call executable by storage node or other computing device that can quickly allocate required space for storing a data set to be transferred without actually writing the data. These commands allow the space to be reserved without taking a longer period of time required for actually writing data to the reserved space. An example of this space reservation is described in greater detail below with respect to FIGS. 10-12.

At stage B, the resource management module 112 receives a CREATED message or other suitable message from the destination storage node 120. The CREATED message or other suitable message indicates whether the space-reservation attempt was successful. In the example depicted in FIG. 3, the storage node 120 receives the CREATE message and stores the request in a local persistent transaction store. The storage node 120 transmits a CREATED(Success) message to the resource management module 112 indicating that the storage node 120 successfully reserved the request space. If the received message indicates that the reservation was successful, the resource management module 112 can update a row for the data set (e.g., "data set 1") in the table 300 to change the status from "INPR" to "SUCS," as depicted in FIG. 6.

Prior to stage C, the resource management module 112 attempts to reserve space for another data set (e.g., "data set 2") at a storage node 121 (not depicted). The resource management module 112 transmits a CREATE message or other suitable command or request to the destination storage node 121 for the data set to be transferred. For example, the resource management module 112 may transmit a command or request to the destination storage node 121. The resource management module 112 updates the table 300 to indicate that a reservation attempt for data set 2 is in progress ("INPR") at the destination storage node 121, as depicted in FIG. 7.

If the reservation attempt fails, the resource management module 112 may receive an error message, and the table 300 can remain unchanged. In some embodiments, the destination storage node 121 can transmit the error message to the resource management module 112. In additional or alternative embodiments, the resource management module 112 or another suitable program can generate the error message if no response is received from the destination storage node 121 after a specified timeout period.

If a failure occurs (e.g., crash of the resource management module 112, crash of a storage node, a network disconnection, a network partition, etc.), and, upon reboot, the table 300 indicates that a reservation is in progress, a CREATE or other suitable message can be retransmitted to the destination storage node 121. If the resource management module 112 again receives an error message indicating that the reservation failed, the table 300 once again stays unchanged.

At stage C, the resource management module 112 responds to receiving one or more error messages associated with the destination storage node 121 by attempting to reserve space on a different destination node, such as the storage node 122. In this example, the resource management module 112 transmits a CREATE message or other suitable command or message to the destination storage node 122, as depicted in FIG. 3. The resource management module 112 can update the table 300 to indicate that the CREATE message or other suitable command or message has been transmitted to the destination storage node 122, as indicated in FIG. 8.

At stage D, the resource management module 112 receives a responsive message from the destination storage node 122 indicating that the space-reservation attempt was successful (e.g., "CREATED(Success)"), and the resource management module 112 updates the table 300 to indicate that space has been successfully reserved space at the destination storage node 122, as depicted in FIG. 9.

FIG. 3 is annotated with a series of letters A-D. These letters represent stages of operations. Although these stages are ordered for this example, the stages illustrate one example to aid in understanding this disclosure and should not be used to limit the claims. Subject matter falling within the scope of the claims can vary with respect to the order and some of the operations.

Figure 10:
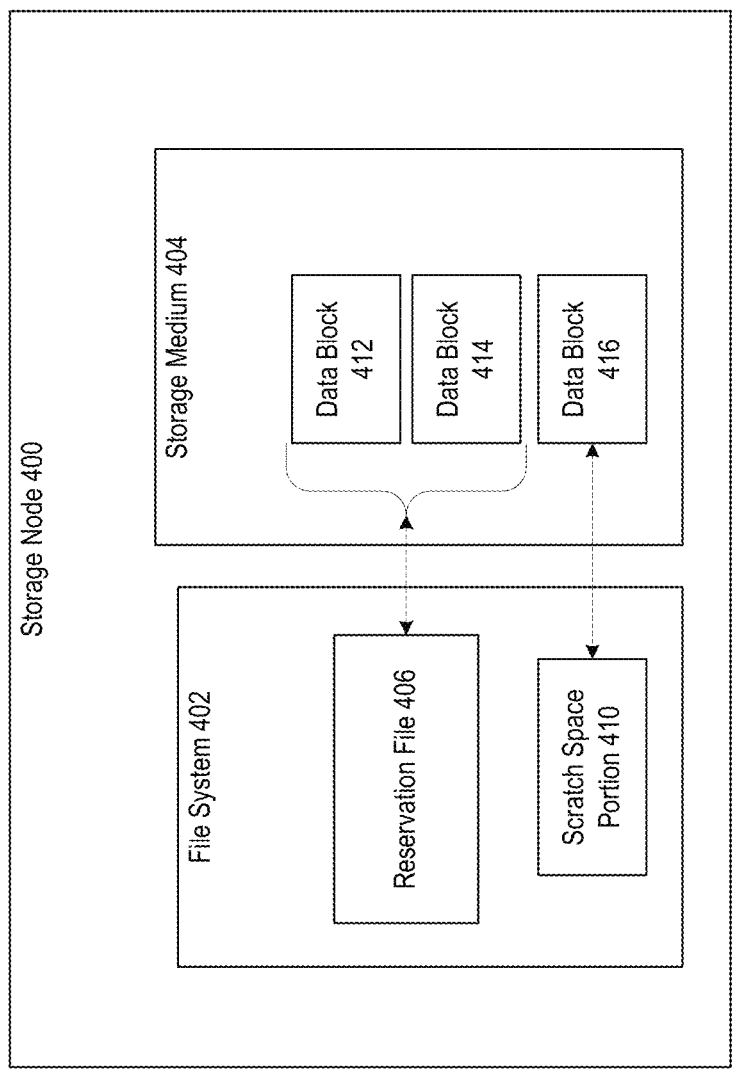
FIG. 10 depicts an example storage node on which a space reservation has been made.

FIG. 10 depicts an example of a storage node 400 (e.g., one or more of storage nodes 120, 121, 122, 123) that can be used in the process described above. The storage node 400 can execute a file system 402 for managing access to a storage medium 404 (e.g., one or more of the storage media 124, 125, 126, 127).

The file system 402 creates a reservation file 406 in response to receiving a CREATE message or other suitable command or request for reserving space from the resource management module 112. The reservation file 406 causes a "reserved" amount of space in a volume on the storage node 400 to become unavailable for processes other than the data-transfer process used for transferring a data set. For example, if the "reserveBytes" field of CREATE message indicates one terabyte of space to be reserved, the reservation file 406 causes one terabyte of space to be inaccessible to processes other than the data transfer process depicted in FIG. 3. In some embodiments, the file system 402 creates a reservation file 406 by marking the file system metadata for a specified number of data blocks in the storage medium 404 as "used." Marking the file system metadata for the data blocks as "used" can eliminate the need to actually write data into each block. In the example depicted in FIG. 10, metadata used by the file system 402 for data blocks 412, 414 of the storage medium 404 is marked as "used" by the reservation file 406.

In some embodiments, the storage node 400 can also reserve a specified amount of space on the storage node 400 as a scratch space. Thus, in the simplified example depicted in FIG. 10, the total amount of space reserved on the storage node 400 can include both the scratch space and sufficient space for the data set. Two data blocks 412, 414 are identified as "used" by the reservation file 406 and are sufficient for storing the data set to be transferred, as indicated by the bidirectional arrow between the reservation file 406 and the data blocks 412, 414 in FIG. 10. The data block 416 is usable as scratch space, as indicated by the bidirectional arrow between a scratch space portion 410 and the data block 416 in FIG. 10.

The scratch space reserved by the storage node 400 is inaccessible for processes other than some privileged data transfer processes. For example, the scratch space can be reserved for use by one or more instances of a repair operation that is used to repair a failed volume or node storing erasure-coded content. In some embodiments, the scratch space is sufficiently large to concurrently write multiple data fragments (i.e., chunks) to the storage node 400.

In some embodiments, a data block 416 used as the scratch space is on the same disk as other data blocks 412, 414 that are reserved using the reservation file 406. In additional or alternative embodiments, a data block 416 used as the scratch space is on a disk that is different from and faster than a disk that includes other data blocks 412, 414 that are reserved using the reservation file 406.

Figure 11:
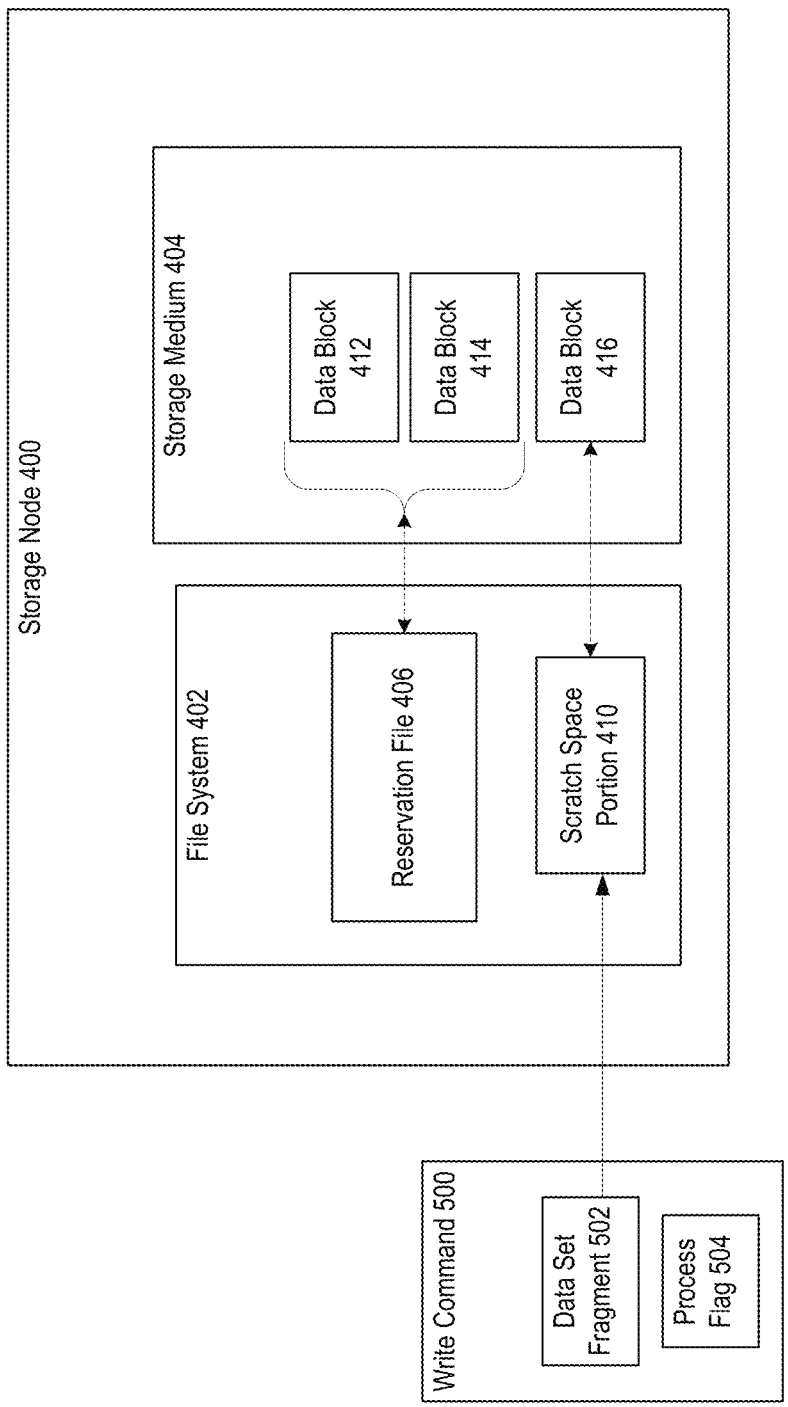
FIG. 11 depicts an example storage node on which a space reservation has been made.
Figure 12:
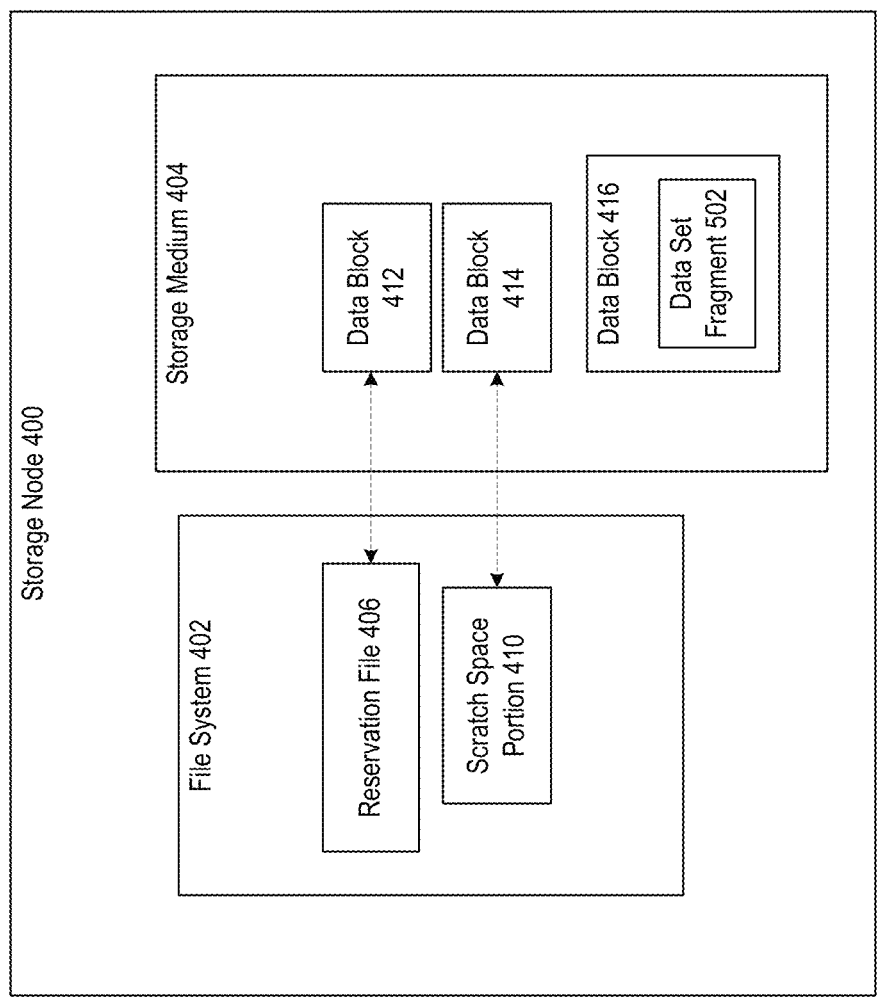
FIG. 12 depicts an example storage node on which a space reservation has been made.

In a case in which all space reservation operations succeed for the data transfer process depicted in FIG. 3, the resource management module 112 can cause one or more data sets to be transferred to the corresponding storage node 400, as depicted in FIGS. 11 and 12. The data set can be transferred to a given storage node 400 in fragments.

In the example depicted in FIG. 11, the resource management module 112 transmits a write command 500 to the storage node 400. The write command 500 includes a data set fragment 502 from the data set being encoded and transferred and a process flag 504. The process flag 504 indicates that the write command 500 is associated with a process for transferring a data set (e.g., the process depicted in FIG. 3). The storage node 400 can respond to receiving the data set fragment 502 by writing the fragment on the disk and then reducing the reserved space (e.g., by truncating the reservation file 406) by an amount corresponding to the size of the data set fragment 502. Reducing or otherwise truncating the reservation file 406 can reduce the size of the reserved space as fragments of the data set are transferred to the storage node 400 and written to the storage medium 404.

The scratch space portion 410 can be used by the storage node 400 for writing fragments of the data set to the storage medium 404. The storage node 400 can use the process flag 504 to verify that a received data fragment 502 is associated with the data-transfer process for transferring the data set. In some embodiments, the storage node 400 maintains the verified data set fragment 502 in the portion of the volume used for the scratch space.

In the example depicted in FIG. 12, the data set fragment 502 is stored in the data block 416. The storage node 400 can then truncate the reservation file 406 and use a portion of the volume that becomes available after truncating the reservation file 406. The freed portion of the volume can be used for any suitable purpose (e.g., for receiving additional fragments of the data set, for replenishing the scratch space, etc.). For example, as depicted in FIG. 12, the reservation file 406 has been truncated such that it corresponds to one data block 412 rather than two data blocks 412, 414. The data block 414 can be used as the scratch space portion 410 for subsequent data set fragments.

In other embodiments, the storage node 400 can truncate the reservation file 406, and then write the data from the scratch space into the portion of the volume that becomes available after truncating the reservation file 406. For example, a data fragment 502 can be written to the data block 416 that is used as scratch space, the reservation file 406 can then be truncated to make the data block 414 available, and the storage node 400 can then move the data fragment 502 from the data block 416 to the data block 414. The data block 416 can then be used as scratch space for additional fragments or for other suitable purposes.

In this manner, writable space is available for the incoming data set even if the storage node 400 or the volume receiving the data set are identified as "read only" for other processes (e.g., other processes that may attempt to write data to the volume or node while space is reserved for transferring a data set). In this case, the data-transfer process managed by the resource management module 112 can be used to write fragments or other portions of a data set into a volume (e.g., the storage medium 404) on the storage node 400. Any other data writes not associated with the data set (e.g., write commands without the process flag 504) can fail as if the volume was full (e.g., by notifying other, concurrently executing processes that the volume is full).

If the entire data set is stored to the storage node 400, the resources management module 112 can remove the record of the reservation request from its persistent transaction store. In some embodiments, the resources management module 112 can regularly run checks in the background for any stored reservation requests with a timed-out wait for a CREATE command. The resources management module 112 can roll back the timed-out CREATE request and remove the corresponding reservation request record from the persistent transactional store if the rollback (e.g., the removal of a reservation file 406) is successful.

In some embodiments, if a storage node 400 did not receive a write command 500 from the resource management module 112 within some interval, the storage node 400 can determine that the request is no longer valid. The storage node 400 can respond to this determination by un-reserving the space held by the reservation file 406. For embodiments involving restoration or repair of erasure-coded content, the storage node 400 can delete a VCS corresponding to the space reservation request.

In some embodiments, a data transfer process can fail if an insufficient number destination nodes and associated space is available for receiving data sets. For example, the resource management module 112 may attempt to transfer three data sets. In the example depicted in FIG. 13, two of the space reservations for two respective data sets may be successful, as indicated by the "CREATED(Success)" message transmitted by the storage nodes 120, 122. However, a third storage node 121 may transmit a "CREATED(Fail)" message to the resource management module 112, indicating that a reservation was unsuccessful for storage node 121.

Continuing with the example table 300 depicted in FIGS. 4-9, the resource management module 112 can attempt to reserve space for a third data set (e.g., "data set 3") at a third destination node. For example, the resource management module 112 transmits a CREATE message or other suitable command or message to a fourth destination storage node 123 if a failure message has been received from another storage node 121 and reservations have already been made for two other data sets on the storage nodes 120, 122. The resource management module 112 can update the table 300 to indicate that the CREATE message or other suitable command or message has been transmitted to the destination storage node 123, as indicated in FIG. 14.

Figure 13:
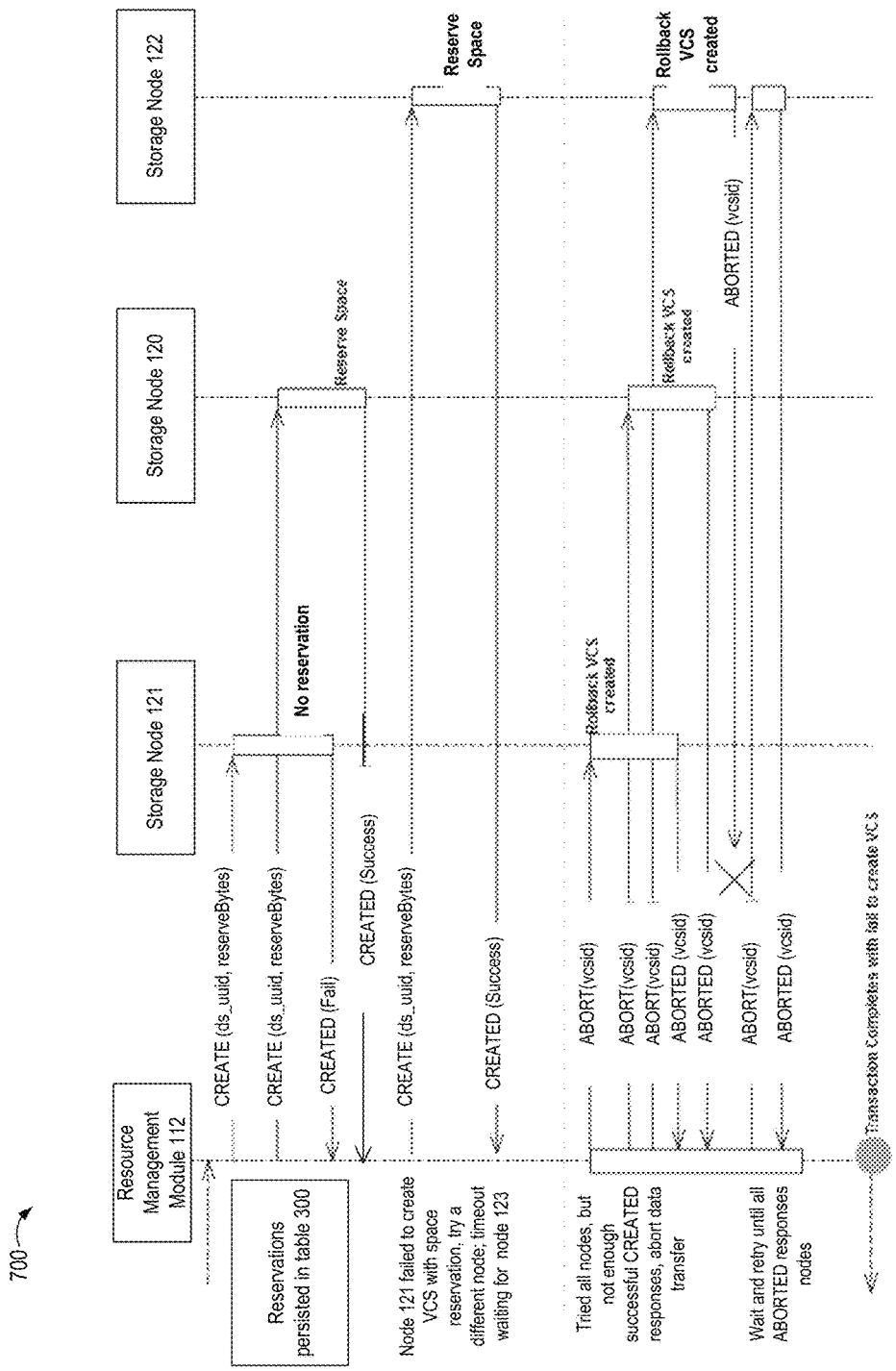
FIG. 13 depicts example operations for a space reservation process.

In the example of a data-transfer process depicted in FIG. 13, a specified time may elapse before the resource management module 112 receives any response from the storage node 123. If the reservation attempt for the third data set fails due to the timeout, the resource management module 112 can receive or generate an error message.

In FIG. 13, no other destination nodes may be available to receive the third data set. If fewer storage nodes are available than the number of data sets to be transferred, the resource management module 112 can terminate the data transfer process prior transferring any data from some or all of the data sets to the destination nodes 120, 122 at which space has been reserved. For example, the resource management module 112 can roll back the data transfer process by transmitting ABORT messages to the destination storage nodes 120, 122, 123. The resource management module 112 updates the table 300 to indicate that the ABORT messages have been transmitted to the destination storage nodes 120, 121, 122, 123, as depicted in FIG. 15.

In response to receiving an ABORT message, a destination node can remove a reservation on a volume that was created in response to a CREATE message provided by the resource management module 112. For example, if a posix_fallocate( ) command is used to perform a space reservation, the destination node can delete an associated reservation file in response to receiving an ABORT message from the resource management module 112.

The resource management module 112 can receive an ABORTED message from the destination storage node 120 and can respond to receiving the ABORTED message by removing a row corresponding to the destination storage node 120 from the table 300. The updated table 300 is depicted in FIG. 16.

The resource management module 112 can also receive an ABORTED message from the destination storage node 122 and can respond to receiving the ABORTED message by removing references to the destination storage node 122 from the table 300. The updated table 300 is depicted in FIG. 17.

The resource management module 112 can also receive ABORTED messages from the destination storage nodes 121, 123 and can respond to receiving the ABORTED messages by removing the corresponding rows from the table 300. The updated table 300 is depicted in FIG. 18.

In some embodiments, an ABORT command may fail or may not be deliverable to a destination node (e.g., if a destination node is no longer available on the network). Eventually the operation will time out, and the data transfer process will fail. The space reservation on a destination node for which an ABORT command fails may not be removed. In these embodiments, if the destination node again becomes available on the network, the destination node can remove or otherwise clean up the space reservation (e.g., by deleting a reservation file) before any new space reservation operations are attempted. In additional or alternative embodiments, the space reservation on the destination node can be removed via a background process once the node comes back online (e.g., rejoins the network).

Figure 19:
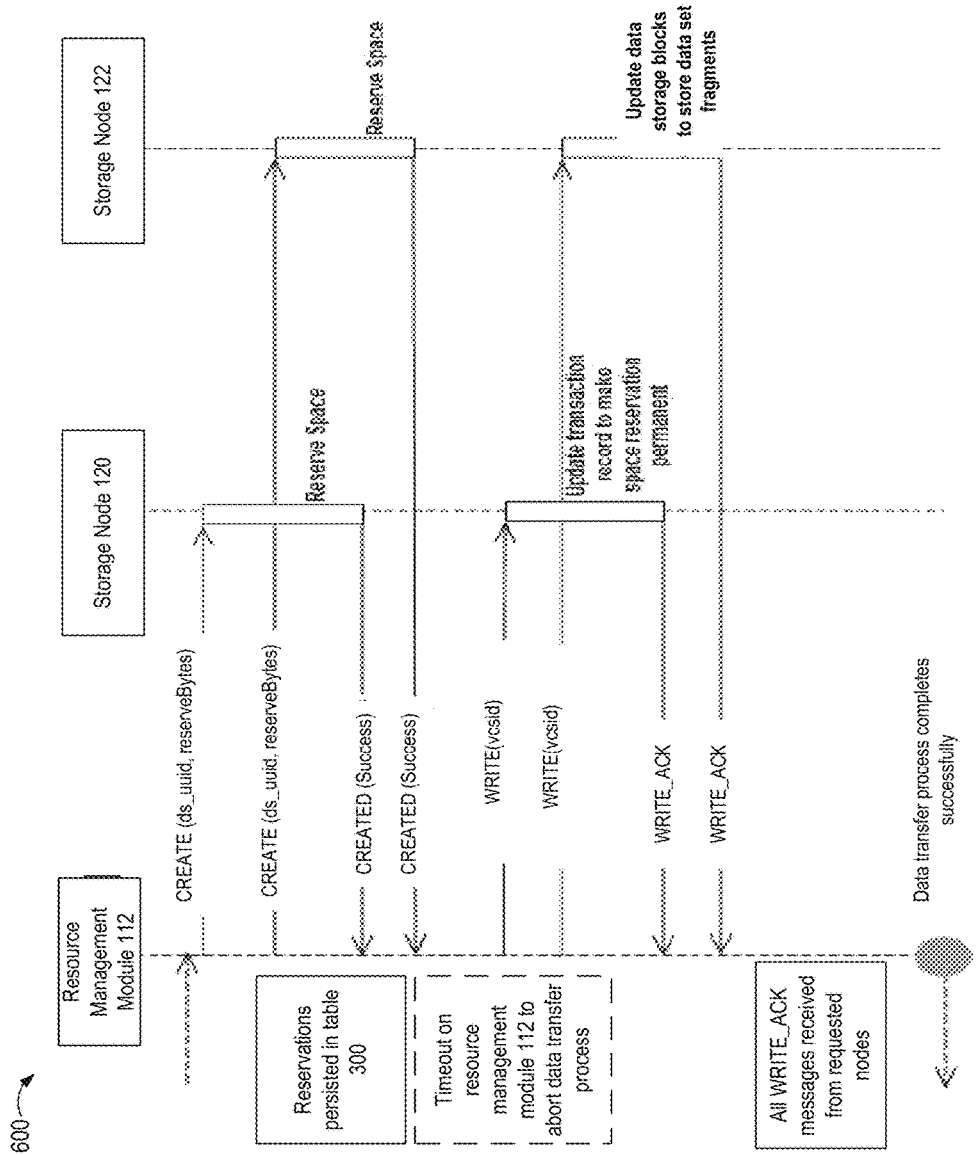
FIGS. 19-22 depict example operations for a space reservation process.

FIG. 19 depicts an alternative example of a data transfer process. In this example, the storage nodes 120, 122 send WRITE_ACK commands to the resource management module 112 after data sets are successfully written to the storage media 124, 126. Other operations depicted in FIG. 19 are similar to the operations in the process depicted in FIG. 3.

Figure 20:
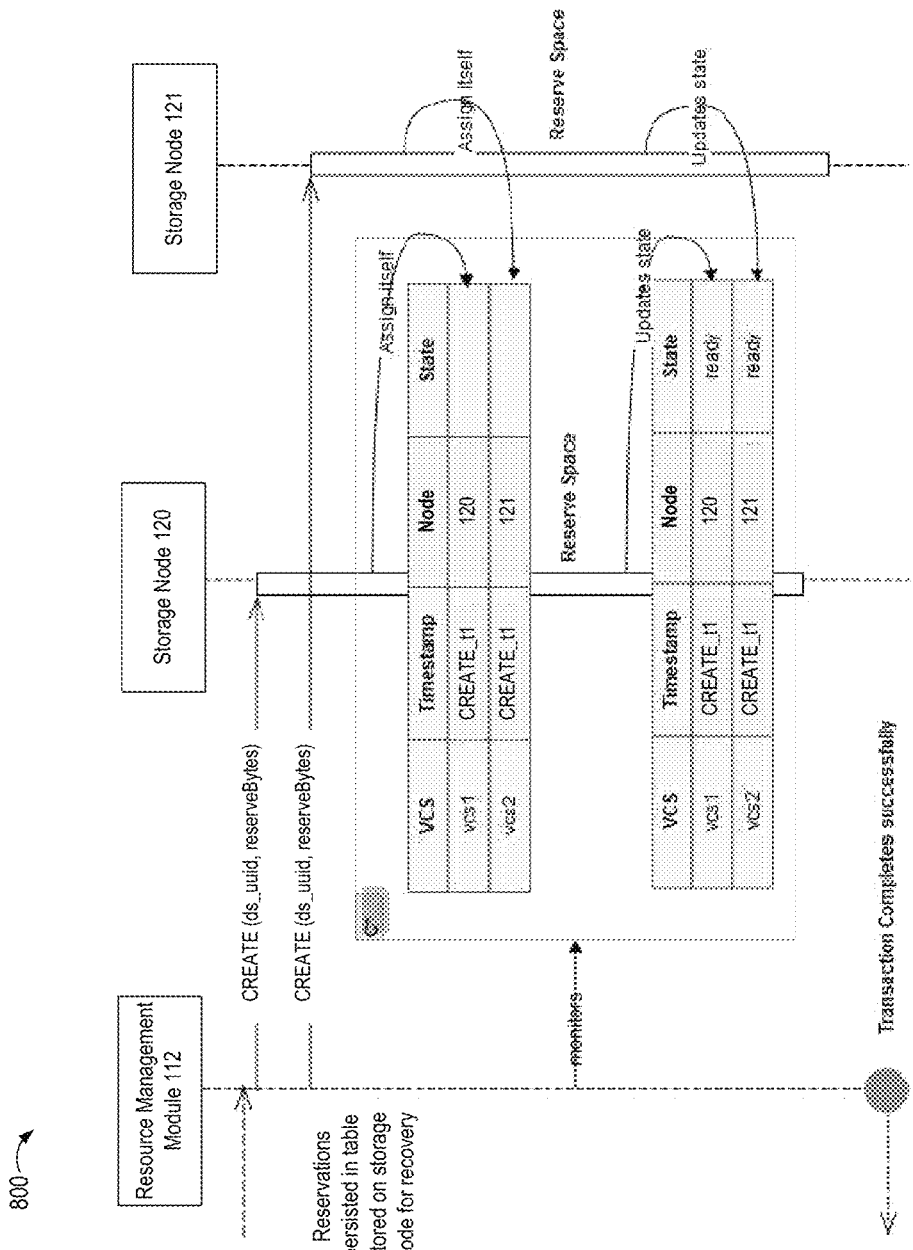
Figure 21:
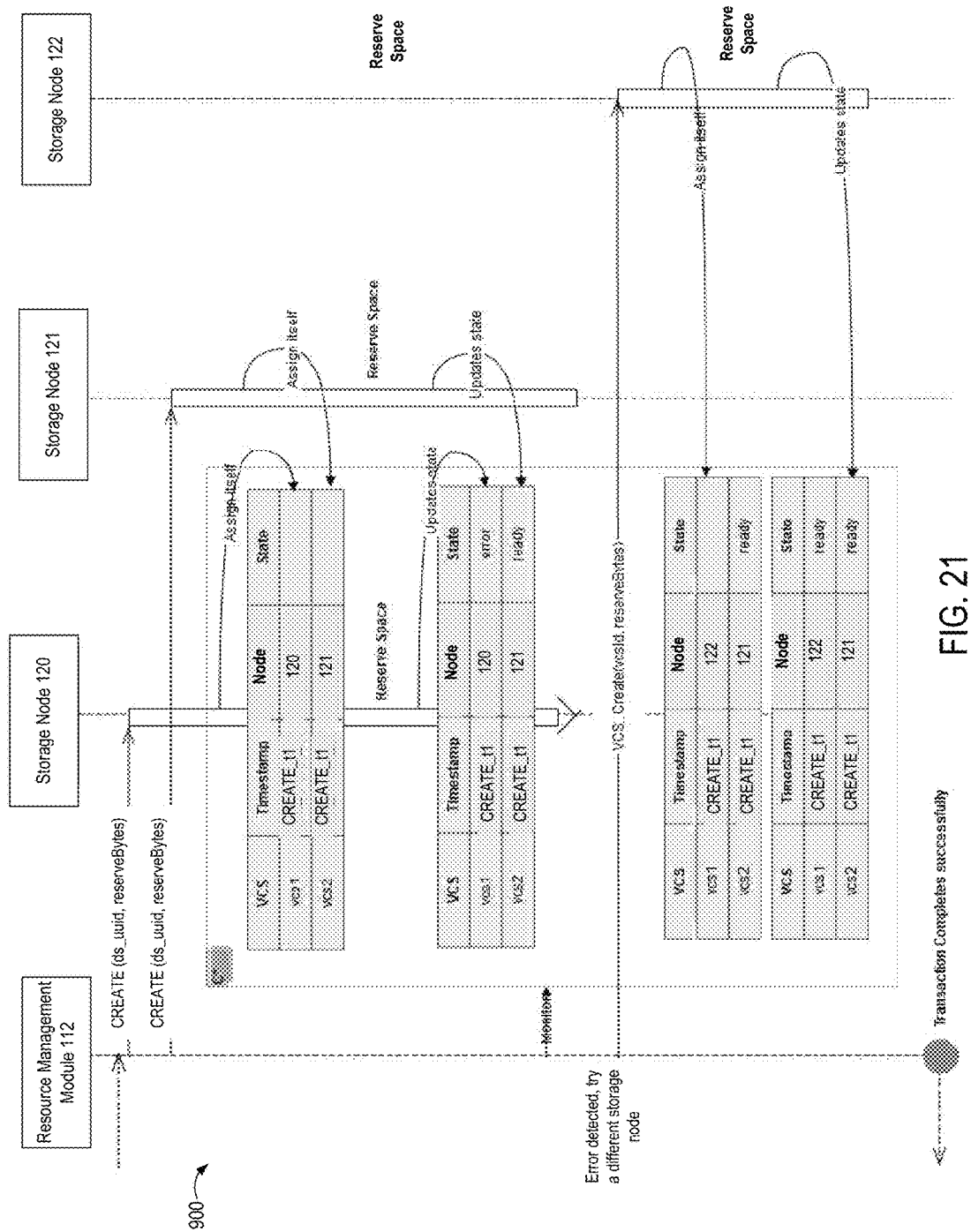
Figure 22:
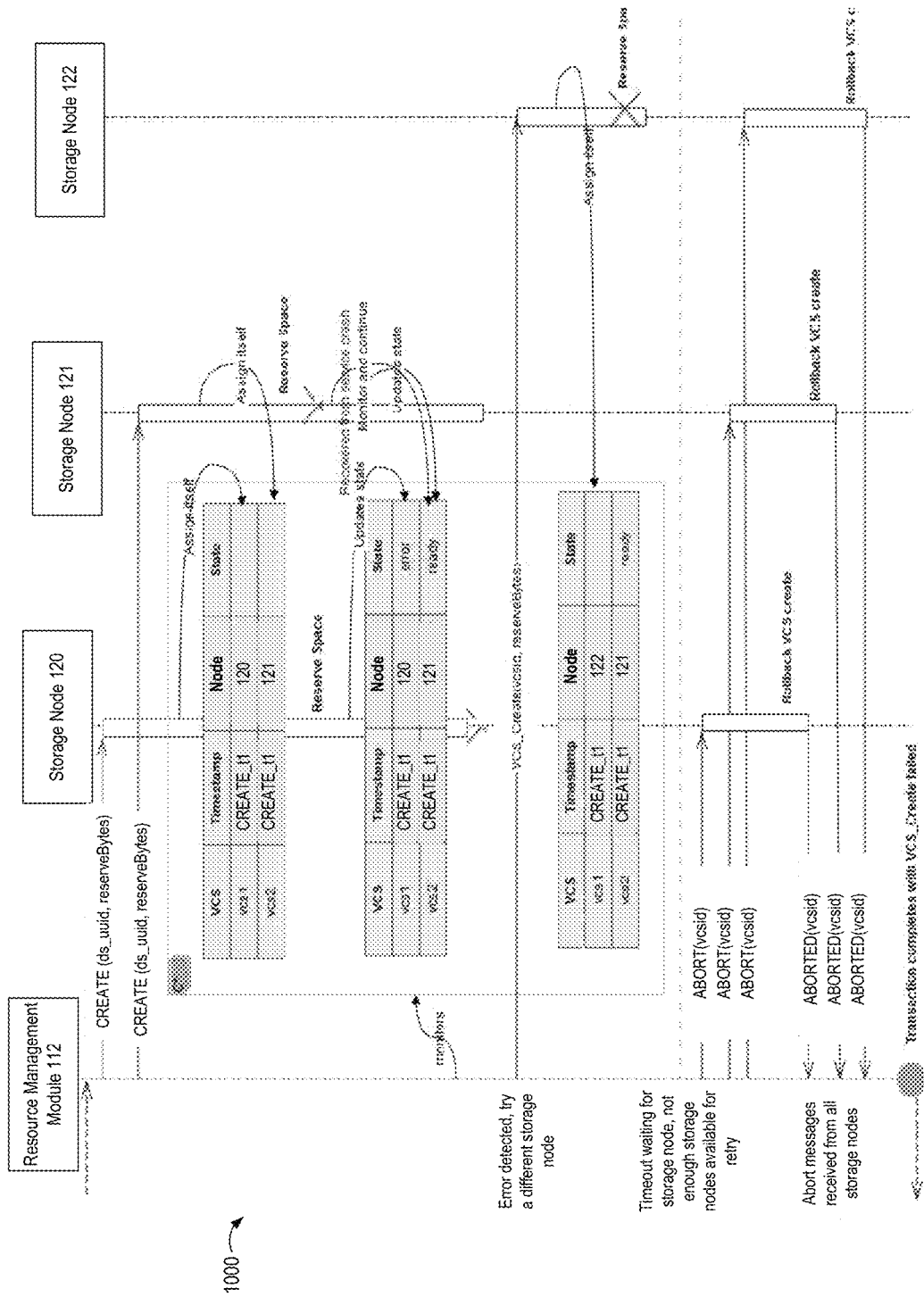

FIGS. 20-22 depict alternative examples of a data transfer process. These examples are similar to the processes described above. However, the table for storing reservation requests is stored on one or more of the storage nodes 120, 121, 122, 123 as opposed to a resource management module 112. Messages received from the other storage nodes are used by the storage node storing the table to update the table.

In the example of FIG. 20, the storage node 120 stores a reservation table for tracking reservation requests. The resource management module 112 monitors the reservation table and inserts reservation requests into the table as write requests are received. The storage nodes 120 and 121 also monitor the reservation table and may assign themselves to reservation requests as new requests are added.

In some implementations, the storage node 120 monitors messages from the resource management module 112 and other storage nodes to maintain and update the reservation table. For example, in FIG. 21, the storage node 120 may update the reservation table after detecting that the storage node 122 has assigned itself to the reservation table for "vcs1".

Although FIGS. 20-22 depict the reservation table as being maintained only on the storage node 120, the reservation table may be mirrored across a number of the storage nodes to ensure that the reservation table is not lost in the event of a storage node failure. The reservation table may be mirrored at periodic intervals. In some implementations, the storage nodes each maintain a reservation table independently of the other nodes and update their table based on messages broadcast among the storage nodes.

Variations

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 23:
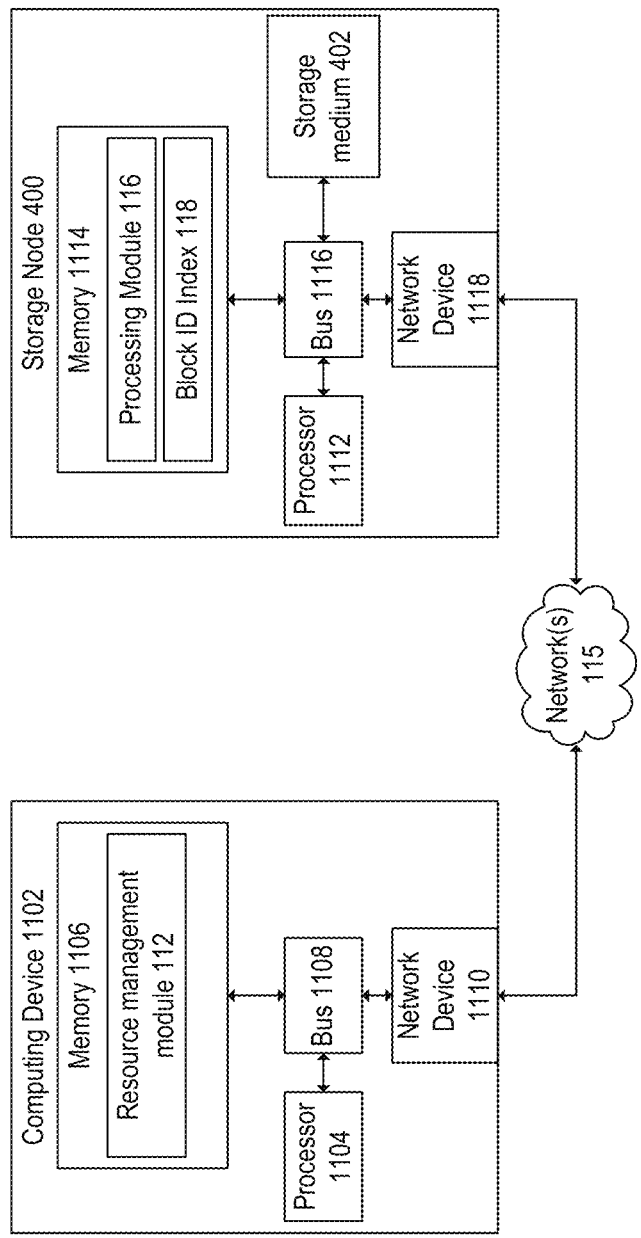
FIG. 23 is a block diagram depicting examples of a storage node and a computing device used for the space reservation process.

Any suitable system implementation can be used for the devices and methods described herein. For example, FIG. 23 is a block diagram depicting examples of a storage node 400 and a computing device 1102 used for the space reservation processes described herein. The computing device 1102 can include any suitable device for managing resources in the distributed storage system 100. In some embodiments, the computing device 1102 can include one or more computing nodes of the distributed storage system 100.

The computing device 1102 and the storage node 400 can respectively include processors 1104, 1112 that are communicatively coupled to respective memory devices 1106, 1114. The processors 1104, 1112 can execute computer-executable program code and/or access information stored in the memory devices 1106, 1114. The processor 1104 can execute a resource management module 112 and/or other computer-executable program code stored in the memory device 1106. The processor 1112 can execute a processing module 116 and/or other computer-executable program code stored in the memory device 1114. When executed by the processors 1104, 1112, the program code stored in the memory devices 1106, 1114 can cause the processors 1104, 1112 to perform the operations described herein. Each of the processors 1104, 1112 may include a microprocessor, an application-specific integrated circuit ("ASIC"), a state machine, or other suitable processing device. Each of the processors 1104, 1112 can include any number of processing devices, including one.

Each of the memory devices 1106, 1114 can include any suitable computer-readable medium. The computer-readable medium can include any electronic, optical, magnetic, or other storage device capable of providing a processor with computer-readable instructions or other program code. Non-limiting examples of a computer-readable medium include a magnetic disk, a memory chip, ROM, RAM, an ASIC, a configured processor, optical storage, magnetic tape or other magnetic storage, or any other medium from which a computer processor can read program code. The program code may include processor-specific instructions generated by a compiler and/or an interpreter from code written in any suitable computer-programming language, including, for example, Hadoop®, C, C++, C#, etc.

The storage node 400 can also include a storage medium 404. In some embodiments, the memory device 1114 and the storage medium 404 can be separate devices, as depicted in FIG. 23. In other embodiments, the memory device 1114 and the storage medium 404 can be included in the same device.

The computing device 1102 and the storage node 400 can also respectively include buses 1108, 1116. Each of the buses 1108, 1116 can communicatively couple one or more components of a respective one of the computing device 1102 and the storage node 400. Each of the buses 1108, 1116 can include one or more devices for coupling various components, such as (but not limited to) a memory bus, a system interconnect device, etc.

The computing device 1102 can also include one or more network devices 1110 and the storage node 400 can include one or more network devices 1118. The network devices 1110, 1118 can include any device or group of devices suitable for establishing a wireless data connection. Non-limiting examples of the network devices 1110, 1118 include one or more of an Ethernet network adapter, an RF transceiver, a modem, an optical emitter, an optical transceiver, etc.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

As used herein, the term "or" is inclusive unless otherwise explicitly noted. Thus, the phrase "at least one of A, B, or C" is satisfied by any element from the set {A, B, C} or any combination thereof, including multiples of any element.

What is claimed is:
1. A method comprising:
transmitting a first request to write a first space reservation file for a first data set to a first storage node and a second request to write a second space reservation file for a second data set to a second storage node, wherein the first data set and the second data set are part of a same data recovery operation;

determining that the first space reservation file was successfully written to the first storage node;
determining that the second request to reserve space for the second data set failed to complete within a first time period; and
transmitting abort requests to the first storage node and the second storage node.

2. The method of claim 1 further comprising indicating in a reservation table that the first request has been sent to the first storage node and the second request has been sent to the second storage node.

3. The method of claim 1 further comprising indicating in a reservation table that the second request has been aborted after the first time period.

4. The method of claim 1, wherein the first space reservation file has a size at least equal to a size of the first data set.

5. The method of claim 1, wherein transmitting the abort requests includes transmitting the abort requests in response to determining that the second request failed to complete within the first time period.

6. The method of claim 1 further comprising:
transmitting a third request to write a third space reservation file for the second data set to a third storage node.

7. The method of claim 1 further comprising:
transmitting the first request in response to determining that a third storage node failed to reserve a third space reservation file for the first data set.

8. One or more non-transitory machine-readable media comprising program code for reserving space on a storage node, the program code to:
transmit a first request to write a first space reservation file for a first data set to a first storage node and a second request to write a second space reservation file for a second data set to a second storage node, wherein the first data set and the second data set are part of a same data recovery operation;
determine that the first space reservation file was successfully written to the first storage node;
determine that the second request to reserve space for the second data set failed to complete within a first time period; and
transmit abort requests to the first storage node and the second storage node.

9. The machine-readable media of claim 8 further comprising program code to indicate in a reservation table that the first request has been sent to the first storage node and the second request has been sent to the second storage node.

10. The machine-readable media of claim 8 further comprising program code to indicate in a reservation table that the second request has been aborted after the first time period.

11. The machine-readable media of claim 8, wherein the first space reservation file has a size at least equal to a size of the first data set.

12. The machine-readable media of claim 8, wherein the program code to transmit the abort requests includes program code to transmit the abort requests in response to a determination that the second request failed to complete within the first time period.

13. The machine-readable media of claim 8 further comprising program code to transmit a third request to write a third space reservation file for the second data set to a third storage node.

14. An apparatus comprising:
a processor; and
a machine-readable medium having program code executable by the processor to cause the apparatus to,
transmit a first request to write a first space reservation file for a first data set to a first storage node and a second request to write a second space reservation file for a second data set to a second storage node, wherein the first data set and the second data set are part of a same data recovery operation;
determine that the first space reservation file was successfully written to the first storage node;
determine that the second request to reserve space for the second data set failed to complete within a first time period; and
transmit abort requests to the first storage node and the second storage node.

15. The apparatus of claim 14 further comprising program code executable by the processor to cause the apparatus to indicate in a reservation table that the first request has been sent to the first storage node and the second request has been sent to the second storage node.

16. The apparatus of claim 14 further comprising program code executable by the processor to cause the apparatus to indicate in a reservation table that the second request has been aborted after the first time period.

17. The apparatus of claim 14, wherein the first space reservation file has a size at least equal to a size of the first data set.

18. The apparatus of claim 14 further comprising program code executable by the processor to cause the apparatus to transmit the abort requests in response to determining that the second request failed to complete within the first time period.

19. The apparatus of claim 14 further comprising program code executable by the processor to cause the apparatus to transmit a third request to write a third space reservation file for the second data set to a third storage node.

20. The apparatus of claim 14 further comprising program code executable by the processor to cause the apparatus to transmit the first request in response to determining that a third storage node failed to reserve a third space reservation file for the first data set.

* * * * *